UNITED STATES PATENT OFFICE.

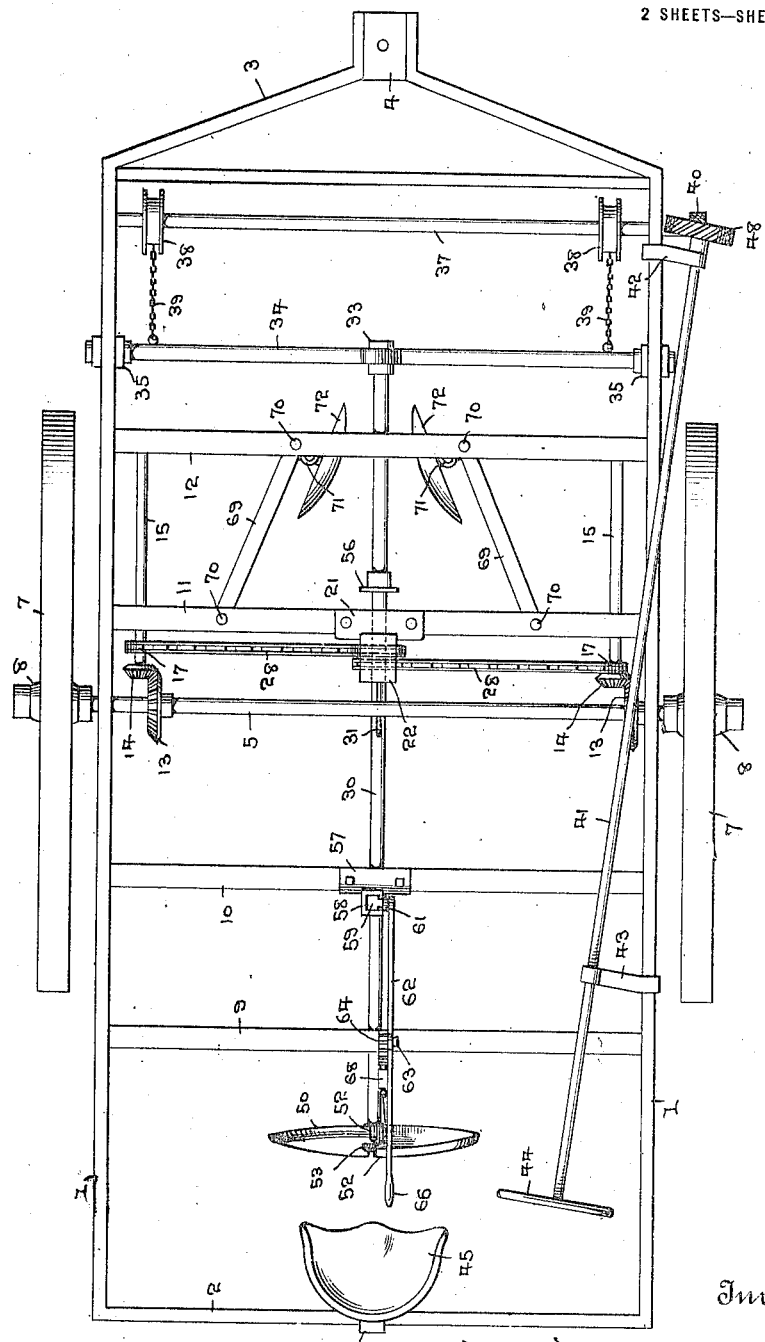

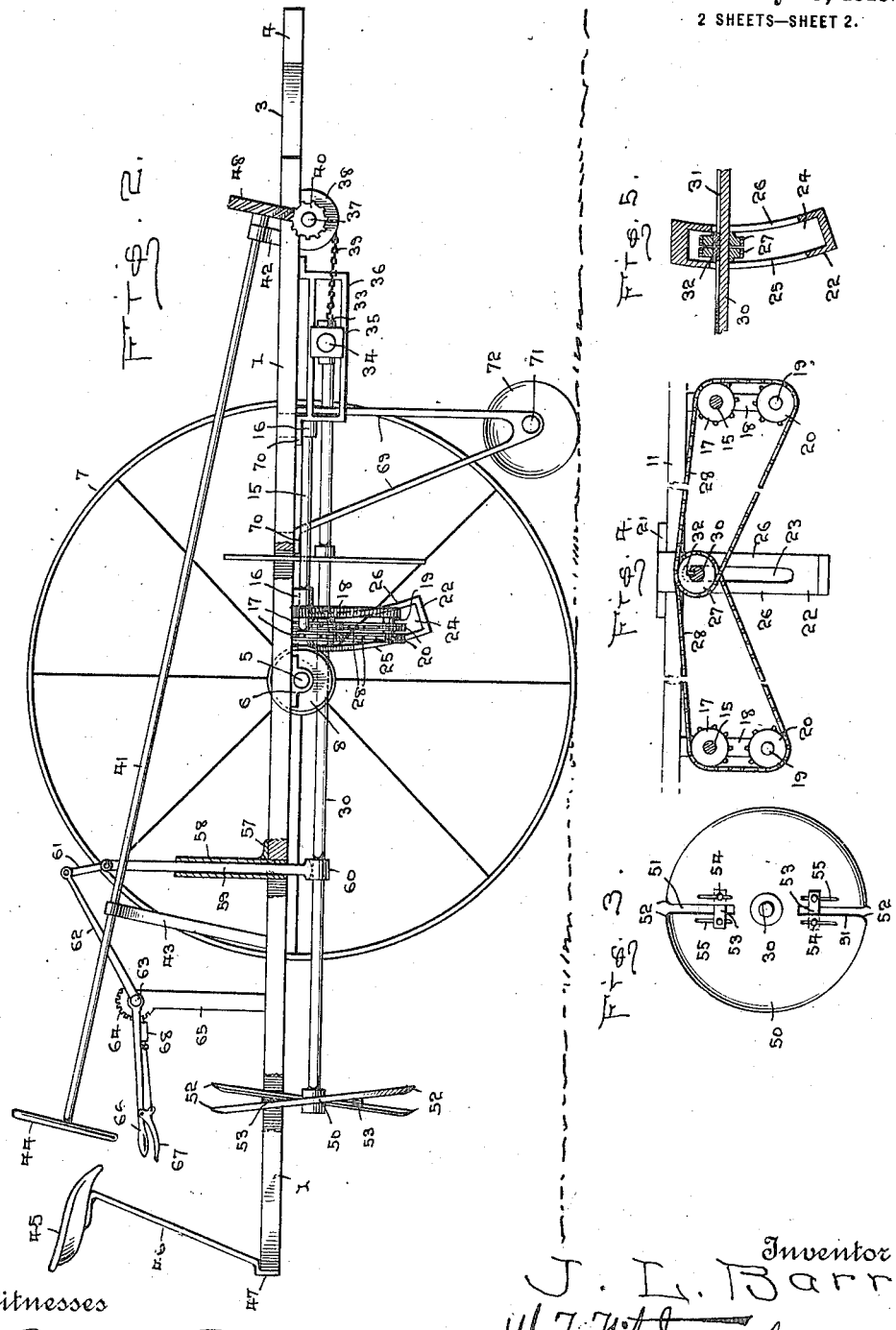
J. L. BARR.
COTTON CHOPPER.
APPLICATION FILED FEB. 12, 1914.
1,145,964.
Patented July 13, 1915.
2 SHEETS—SHEET 2.

JOHN L. BARR, OF GUTHRIE, OKLAHOMA.

COTTON-CHOPPER.

1,145,964.　　　　　Specification of Letters Patent.　　Patented July 13, 1915.

Application filed February 12, 1914.　Serial No. 818,222.

*To all whom it may concern:*

Be it known that I, JOHN L. BARR, a citizen of the United States, residing at Guthrie, in the county of Logan and State of Oklahoma, have invented certain new and useful Improvements in Cotton-Choppers; and I do hereby declare the following to be a full, clear, and exact description of the invention, such as will enable others skilled in the art to which it appertains to make and use the same.

This invention relates to cotton choppers and more particularly to cotton choppers of the straddle row type.

One of the objects of this invention is the provision of transversely and vertically disposed revolving split disks for efficiently chopping the cotton from the steps between the hills of cotton along the rows of the same.

Another object of this invention resides in the provision of means for the longitudinal adjustment of the chopping disk for preventing the destruction of the cotton plants which are desired to remain in the rows thereof.

A further object of this invention resides in the construction of driving means for the revolving disk, whereby the disk may be raised or lowered without effecting by undue strains any of the parts constituting the driving means.

A still further object of this invention resides in the construction of means for efficiently and accurately retaining the revoluble shaft of the cutting disk in strict vertical alinement within the machine and for preventing any lateral movements of the cutting disk.

A still further object of this invention is the provision of means for determining the relative positions of the spaced portions in the periphery of the disk for avoiding the hills of cotton to be retained in the rows. And a still further object of this invention is the provision of a pair of oppositely disposed and reversely directed disks for operating in advance of the chopping disk and for coaction therewith.

These and other objects will more fully appear and the nature of the invention more clearly understood by the construction, combination and arrangements of the parts thereof as described in the following specification, defined in the appended claims and illustrated in the accompanying drawings, in which, Figure 1 is a top plan view of a cotton chopper showing the parts thereof in assembled relation and as the same appears when ready for use. Fig. 2 is a side view of a cotton chopper with the right master wheel removed and a portion of the frame adjacent thereto broken away showing the parts arranged beneath the machine, the chopping disk at the rear thereof and the revoluble shaft therefor being shown in elevated position. Fig. 3 is a rear view of the chopping disk constituting part of my invention showing the construction of the same and the means for adjusting the degree of space between the cutting edges of the disk. Fig. 4 is a detailed view of the driving mechanism for revolving the disk shaft and showing the means providing for the vertical movements of the disk shaft. Fig. 5 is a sectional detailed view of the guiding block through which the revoluble disk shaft passes and is vertically slidably mounted therein and showing the mounting of the sprockets thereon within the guiding block for revolving the disk shaft.

Similar reference characters denote similar parts through the several views of the drawings wherein reference being had to the same, 1 denotes the side rails of the frame, 2 the rear rail thereof, 3 the forward end of the frame and 4 the attaching means or support for the tongue.

Arranged transversely of the frame and approximately intermediate of the ends of the frame is the axle 5 journaled within the brackets 6 arranged upon the underside of each of the rails 1, and mounted upon the protruding ends of the axle 5 are the master wheels 7, and within the hubs 8 of the wheels 7 may be arranged pawl and ratchet mechanism, in either or both of the hubs 8 or any other preferred form for connecting the hubs 8 of the wheels 7 to the axle 5 for efficiently revolving the same.

Transversely disposed within the frame and between the rear end thereof and the axle 5 are the parallel and spaced cross bars 9 and 10 and also arranged transversely within the frame and in advance of the axle 5 are the parallel and spaced cross bars 11 and 12.

Arranged within the frame and upon the axle 5 in proximity to the side rails 1 are the beveled gears 13 designed to mesh with the bevel gears 14 arranged upon the rear ends of the stub shafts 15 journaled within the brackets 16 secured to the undersides of the cross bars 11 and 12 adjacent the ends thereof.

Arranged upon each of the stub shafts 15 and adjacent the bevel gears 14 are the sprocket wheels 17, and depending from the brackets 16 of the cross bar 11 are the arms 18 provided with the rearwardly extending pintles 19 for supporting the idlers 20.

Arranged upon the cross bar 11 at a point centrally of the stub shafts 15 is the bracket 21 for supporting the downwardly extending arcuate guide block 22, the block being curved in a forward direction, the same also being slotted for a portion of its longitudinal length and in both of the transverse directions therethrough, as at 23 and 24, providing the two rear guide bars 25 and the two forward guide bars 26 and within which and vertically slidable therein are the sprockets 27 around which and the driving sprockets 17 and the idlers 20 are the driving sprocket chains 28 forming the driving connections between the driving sprockets 17 the idlers 20 and the driven sprockets 27 within the guide block 22.

Disposed along the longitudinal medial line of the frame and beneath the same is the revoluble shaft 30 extending through the guide block 22 between the guide bars 25 and 26 respectively, beyond each side of the axle 5 and provided approximately intermediate of its ends with the elongated longitudinal groove 31, the groove 31 providing for the slidable connection with the sprockets 27 within the guide block 22, the sprockets 27 being arranged upon the shaft 30 through the means of the key 32. The manner of mounting the sprockets 27 upon the revoluble shaft 30 within the guide block 22 provides for the rotation of the shaft 30 and at the same time provides for the longitudinal movements of the shaft 30 independent of the sprockets 27, the sprockets 27 being prevented from being moved forwardly or rearwardly with the shaft 30 by the guide bars 25 and 26 of the guide block 22. The sprockets 27 and the shaft 30 are capable of vertical slidable movements within the guide block 22 but are at the same time prevented from any lateral movement thereby retaining the revoluble shaft 30 in strict longitudinal alinement beneath the machine.

The forward end of the shaft 30 is rotatably mounted as at 33 within the cross bar 34 at a point intermediate of the ends thereof. The ends of the bar 34 are pivotally mounted within the sliding blocks 35 arranged within the guide frames 36 attached to the undersides of each of the rails 1 of the frame.

Rotatably mounted within the frame at a point in advance of the bar 34 is the shaft 37 provided adjacent each of its ends with the winding drums 38, the drums 38 being connected to the slidably mounted bar 34 through the means of the cables or chains 39, the chains are for the purpose of drawing the sliding bar 34 in a forward direction when the chains 39 are wound upon the drums 38 when the shaft 37 is rotated, the forward movement of the sliding bar 34 necessarily carries the revoluble shaft 30 also forwardly as the shaft 30 is secured to the bar 34 by the head or other means 33. For revolving the shaft 37 the gear wheel 40 is arranged upon the projecting end of the shaft at the right of the machine.

For revolving the shaft 37 for operating the sliding bar 34 there is provided the elongated rod 41 secured to the right hand side rail 1 of the frame and supported thereon by the forward support 42 and the rear support 43, the support 43 being of greater height than the support 42, thus positioning the rod 41 in a downwardly inclined direction, and at the rear end of the rod 41 is the hand wheel 44 in proximity to the seat 45 arranged upon the support 46 attached to the rear rail 2 of the frame as at 47, and upon the forward end of the rod 41 beyond the support 42 is the gear wheel 48 for meshing with the gear wheel 40 of the shaft 37 for revolving the same.

Upon the rear end of the revoluble shaft 30 is fixedly mounted the disk 50, the disk being vertically and laterally disposed upon the shaft 30, and provided with the diametrically opposed radial slots 51 for providing the spaced edges 52, the spaced edges being formed by distending the portions of the disks adjacent the slots 51 in opposite directions and retained in such distended spaced relation by the means of the interposed spacing bars 53, the spacing bars 53 being passed transversely through the slots 51 and having the opposing faces at the opposite ends thereof engaging the opposite faces respectively of the disk at each side of the slot 51, the spacing bars 53 are retained upon the disk 50 through the means of the bolts 54 passing through the adjusting slots 55 arranged within the disk at each side of the slots 51 and parallel therewith. The purpose of the slots 51, the cross bars 53 within the slots and the adjusting slots 55 is to provide means for adjusting the degree of space or distance between the cutting edges 52 of the disk, whereby a greater or less space of ground for cotton hills may be avoided as desired. For determining the relative position of the spaces formed in the periphery of the disk 50 is provided the indicator 56, this indicator is arranged upon the shaft 30 at any suitable distance in advance of the cutting disk 50 and constructed of elongated rectangular shape and positioned in a manner as to always be in registration with the radial slots 51 of the disk 50.

Mounted centrally upon the cross bar 10 of the frame and by any suitable means is the bracket 57 of the channel bar 58 into which is slidably mounted the actuating rod 59, the lower end of the rod 59 being provided with the journal 60 through which the shaft 30 is designed to be revolubly retained. The upper end of the actuating rod 59 is pivotally connected with one end of the link 61, the other opposite end of the link 61 being pivotally connected to the lever 62, the lever 62 being of obtuse angular shape and pivotally mounted intermediate its ends as at 63 to the segmental rack bar 64 supported upon the cross bar 9 of the frame by the standard 65. A lever 62 is provided with the usual handle 66 and the finger grip 67 for operating the latch 68 which engages the teeth of the rack bar 64. The function of the lever 62 and its connections with the revoluble shaft 30 is to provide means for lowering the shaft 30 for the purpose of setting the blades of the disk 50 in the ground or for elevating the same beneath the machine when not in use.

Oppositely disposed at each side of the revoluble shaft 30 within the frame and obliquely and oppositely disposed to each other are the approximately triangular frames 69 connected to the undersides of the cross bars 11 and 12 by any suitable means as shown at 70, the lower ends of the frames 69 are each provided with the inwardly projecting pintles 71 and upon each of which is mounted the obliquely disposed and oppositely directed disks 72, these disks being designed for operating at each side of the rows of cotton and to coöperate with the cutting disks 50 for the efficient thinning of the cotton.

The operation of this invention may be more clearly understood from the following: Assuming the machine to be in operation, the operator of the machine upon determining by the indicator 56 that there will be no plants left within the space avoided by the cutters of the chopping disks, it is only necessary for him to grasp the wheel 44 and by revolving the same with the rod 41 the worm gear 48 meshing with the gear 40 of the shaft 37 revolves shaft 37 and also the winding drums 38 thereon, whereupon the chains or other connections 39 upon being wound by the drums 38 necessarily draws the slide bar 34 rapidly forward, the forward movement of the shaft 34 necessarily moves the shaft 30 also forwardly therewith, the shaft 30 being capable of this movement through its keyed or splined connections with the sprockets 27 within the guide blocks 22 whereby the cutting disk 50 upon the end of the shaft 30 will be sufficiently rapidly advanced for positioning one or the other sets of the cutting edges 52 of the disk 50 whereby certain ground may be avoided having cotton plants therein. The cutting disk 50 may be readily returned to its normal rearward position under the draft exerted upon the same when in the ground by the forward movement of the machine.

While I have here shown and described the preferred embodiment of my invention, I hereby reserve the right to make such alterations and variations therein from time to time as I may deem expedient and which will not depart from the spirit of the invention nor conflict with the scope of the appended claims.

Having thus fully described my invention what I claim as new and desire to secure by Letters Patent of the United States is:—

1. A cotton chopper, comprising a main frame, an axle arranged thereon, master wheels arranged upon said axle, a shaft extending longitudinally of said frame and revolubly mounted therein, a chopping implement arranged upon said shaft, driving connections between said axle and said shaft for revolving the shaft and said chopping implement, means for raising and lowering said revoluble shaft and said implement, means for advancing or receding said shaft and implement relative to and independently of said frame, and a guide arranged centrally of said frame, and said shaft for preventing lateral movements of said shaft and said implement, said guide also providing for the vertical movements of said shaft and implement.

2. A cotton chopper, comprising a main frame, an axle arranged thereon, master wheels arranged upon said axle, a shaft extending longitudinally of said frame and revolubly mounted therein, a chopping implement arranged upon said shaft, driving connections between said axle and said shaft for revolving the shaft and said chopping implement, a bar slidably mounted in said frame and connected to said shaft, and means for actuating said bar for advancing or receding said revoluble shaft and said implement relative to and independently of said frame for adjusting the position of said implement with respect to the cotton plants.

3. A cotton chopper, comprising a main frame, an axle arranged thereon, master wheels arranged upon said axle, a shaft extending longitudinally of said frame and revolubly mounted therein, a chopping implement arranged upon said shaft, driving connections between said axle and said shaft for revolving the shaft and said chopping implement, means for raising and lowering the rearward end of said revoluble shaft together with said implement, a bar slidably mounted in said frame, and having its central portion pivotally connected to the forward end of said shaft for advancing or receding said shaft and said implement relative to and independently of said frame, means upon said frame for guiding the ends of said bar, and means arranged upon said frame in advance of said bar and connected therewith for actuating said bar during the chopping operations.

4. A cotton chopper, comprising a main frame, an axle arranged thereon, master wheels arranged upon said axle, a main shaft extending longitudinally of said frame and revolubly mounted therein, a chopping implement arranged upon said main shaft, means for advancing or receding said main shaft and said implement relatively to and independently of said frame, a guide arranged centrally of said frame and said main shaft for preventing lateral movements of said main shaft and said implement, said guide also providing for the vertical movements of said main shaft and said implement, sprocket wheels keyed upon said main shaft within said guide, stub shafts revolubly mounted in said frame, gears connecting said stub shafts with said axle, sprocket wheels upon said stub shafts in alinement with the respective sprocket wheels upon said main shaft, and sprocket chain connections between said sprocket wheels for revolving said main shaft and said implement.

In testimony whereof I have signed my name to this specification in the presence of two subscribing witnesses.

JOHN L. BARR.

Witnesses:
  M. L. MOCK,
  BENJAMIN BARRETT.